United States Patent
Fleming

(10) Patent No.: US 7,853,748 B2
(45) Date of Patent: Dec. 14, 2010

(54) METHOD AND APPARATUS TO OBTAIN CODE DATA FOR USB DEVICE

(75) Inventor: Bruce Fleming, Morgan Hill, CA (US)

(73) Assignee: Intel Corporation, Santa Clara, CA (US)

(*) Notice: Subject to any disclaimer, the term of this patent is extended or adjusted under 35 U.S.C. 154(b) by 148 days.

(21) Appl. No.: 12/242,293

(22) Filed: Sep. 30, 2008

(65) Prior Publication Data

US 2010/0082872 A1 Apr. 1, 2010

(51) Int. Cl.
  *G06F 13/36* (2006.01)
  *G06F 13/20* (2006.01)
  *G06F 3/00* (2006.01)

(52) U.S. Cl. .................. 710/311; 710/19; 710/105; 710/308; 710/310; 710/313

(58) Field of Classification Search .................. 710/310
  See application file for complete search history.

(56) References Cited

U.S. PATENT DOCUMENTS

| | | | |
|---|---|---|---|
| 6,249,739 B1 | 6/2001 | Noehring et al. | |
| 6,622,244 B1 | 9/2003 | Eidson et al. | |
| 6,742,076 B2* | 5/2004 | Wang et al. | 710/314 |
| 6,889,262 B1* | 5/2005 | Gulick | 710/5 |
| 7,249,253 B2 | 7/2007 | Eidson et al. | |
| 7,281,074 B2 | 10/2007 | Diefenbaugh et al. | |
| 7,340,550 B2* | 3/2008 | Derr et al. | 710/308 |
| 7,634,587 B2* | 12/2009 | Ferguson et al. | 710/5 |
| 2002/0116565 A1* | 8/2002 | Wang et al. | 710/313 |
| 2004/0030840 A1* | 2/2004 | Hesse et al. | 711/137 |
| 2004/0210698 A1* | 10/2004 | Nguyen | 710/260 |
| 2005/0033896 A1* | 2/2005 | Wang et al. | 710/314 |
| 2006/0123181 A1* | 6/2006 | Aull et al. | 710/310 |
| 2007/0005824 A1 | 1/2007 | Howard | |
| 2007/0005859 A1 | 1/2007 | Diefenbaugh et al. | |
| 2007/0219751 A1 | 9/2007 | Huang | |
| 2008/0005445 A1 | 1/2008 | Diefenbaugh et al. | |
| 2008/0301330 A1* | 12/2008 | Sakai et al. | 710/33 |

* cited by examiner

*Primary Examiner*—Ryan M Stiglic
(74) *Attorney, Agent, or Firm*—KED & Associates, LLP

(57) ABSTRACT

A method and apparatus are provided that include creating an image of a page descriptor at a universal serial bus (USB) device, transferring the image of the page descriptor to a main memory, modifying a schedule list in a main memory based on the transferred image, identifying an active transaction in the modified schedule list, and providing code data to the USB device from the main memory based on the identified active transaction.

18 Claims, 4 Drawing Sheets

METHOD AND APPARATUS TO OBTAIN CODE DATA FOR USB DEVICE

BACKGROUND

1. Field

Embodiments of the present invention may relate to computer systems.

2. Background

A computer system may be equipped with a universal serial bus (USB). USB ports allow USB-enabled devices to connect and communicate with the computer system. Examples of electronic devices that communicate with computer systems through USB ports include digital cameras, keyboards, hard drives, and printers A USB host controller is in charge of the USB bus in a computer system. The USB host controller may be a collection of software and hardware inside the computer system that supports the USB bus. The USB host controller may be responsible for identifying devices that are connected to a USB port. The USB host controller may dynamically load needed device drivers. The USB host controller may also periodically poll each of the attached devices for data communications.

BRIEF DESCRIPTION OF THE DRAWINGS

Arrangements and embodiments may be described in detail with reference to the following drawings in which like reference numerals refer to like elements and wherein.

DETAILED DESCRIPTION

As memory requirements of communication devices continue to increase, cost and power of these devices (such as 3/4G modems, Worldwide Interoperability for Microwave Access (WiMAX), and 802.11x) may become increasingly difficult to support in a mobile platforms. Memory requirements may be the result of a protocol stack that executes as firmware (FW) on the communication device. One method to reduce memory requirements of these devices is by providing code paging capabilities where large portions of code are stored in a main system memory. The communication device may pull code pages (or code data) on-demand from the main memory into the communication device and then execute the code. This may be considered a pull type method of data retrieval.

Devices attached to a universal serial bus (USB), a serial peripheral interface (SPI), and/or a secure digital input output (SDIO) link may not use code paging because the specific interfaces may not allow direct access to main memory, such as in Peripheral Component Interconnect (PCI). Rather, a host controller and device drivers may provide buffer addresses to the host controller rather than the specific device supplying an address request. However, a roundtrip delay of page fulfillment may be quite high. For example, in order to obtain code page data for the device, numerous operations may occur including requesting a specific code page data to the device driver, the device driver requesting the code page data be transferred from the main memory to the device, and the host controller completing the transfer request of the code page data from the main memory to the device.

Embodiments of the present invention may use attributes of a USB to reduce a roundtrip delay of a data request to a main memory. Embodiments of the present invention may allow the USB device to modify a schedule list (or transaction list) of the USB host controller. The schedule list of the USB host controller may reference a specific page of the device FW that resides in main memory. This may be considered a pull type of method of data retrieval. Embodiments of the present invention may also eliminate or minimize excursions to the host controller driver, the device driver, and/or the operating system during the process of obtaining code pages from the main memory. Further, the entire transfer of data from the main memory to the device may be completed without any processor assistance.

Figure 1:
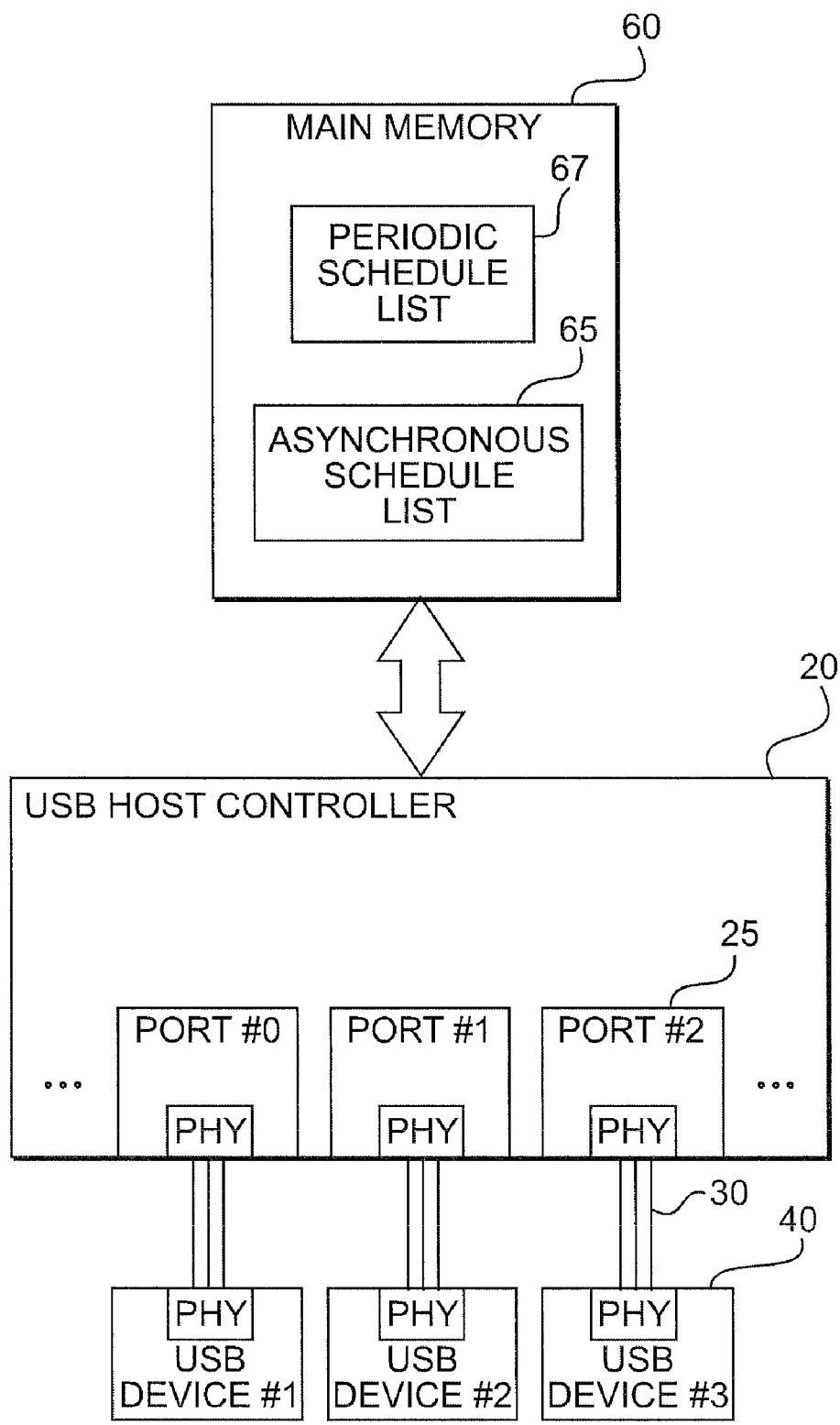
FIG. 1 is a diagram of a computer system that supports a universal serial bus (USB) according to an example arrangement.

FIG. 1 is a diagram of a computer system that supports a universal serial bus (USB) according to an example arrangement. Other arrangements may also be provided. As shown, a computer system 10 may include a USB host controller 20 and one or more USB ports 25. FIG. 1 also shows a plurality of USB devices 40. A physical layer (PHY) may be provided on both the USB port 25 and the USB device 40 for communicating data over a link 30 between the USB port 25 and the USB device 40. Each USB device 40 may communicate over a separate link with the USB host controller 20. FIG. 1 also shows that a main memory 60 (or system memory) may include an asynchronous schedule list 65 and a periodic schedule list 67.

The USB protocol specification revision 2.0 (hereinafter "USB 2.0 protocol") defines four types of transfers: interrupt, isochronous, bulk, and control transfers. For the Enhanced Host Controller Interface (EHCI) implementation of the USB host controller 20, the interrupt and isochronous transfers may be serviced according to the periodic schedule list 67 stored in the main memory 60. On the other hand, bulk and control transfers may be serviced according to the asynchronous schedule list 65 stored in the main memory 60. Although the examples are described in view of the EHCI implementation of the USB host controller 20, the described systems and methods can be applied to other types of USB host controller implementations such as an open host controller interface (OHCI), a universal host controller interface (UCHI), or to other implementations of a serial bus controller.

Bulk transfers may be designed to support devices that need to communicate relatively large amounts of data at variable times, such as a memory or a networking device, for example. A bulk transfer can use any available bandwidth, and data is guaranteed to be delivered, but with no guarantee of bandwidth or latency. Control transfers may be used for configuring devices, such as after a USB device signals that it has been connected and reset, for example. The USB host controller 20 may service asynchronous transfers (from the asynchronous schedule list 65) when they occur using the channel bandwidth remaining after periodic transfers (from the periodic schedule list 67).

The asynchronous schedule list 65 may be a circular linked list of schedule work items that provides a round-robin service opportunity for asynchronous transfers. The schedule work items include one or more queue heads. Each queue head may represent a single (bulk or control) transfer corresponding to a specific endpoint. An endpoint is a logical entity residing on the USB device 40 requiring service. The queue head may include transfer descriptors associated with the corresponding queue head. Each transfer descriptor may represents a discrete amount of work (i.e., data to either transmit to, or receive from, a specific endpoint using one or more transactions) to occur over the corresponding USB link 30.

The USB host controller 20 may traverse the circular linked list of queue heads and execute a transaction associated with the queue head. The USB host controller 20 may continue traversal of the circular linked list until: i) no transactions were executed during a last traversal of the circular linked list; ii) a start of a new micro-frame occurs that switches processing by the USB host controller 20 over to the periodic schedule list 67; or iii) software disables the asynchronous schedule list 65. The USB host controller 20 may consult the asynchronous schedule list 65 in the main memory 60 to discover and execute transactions. To optimize data throughput, the asynchronous schedule list 65 may be parsed frequently (e.g., every ten to twenty microseconds (µsec)).

As the asynchronous schedule list 65 is traversed, transactions may be executed on the USB and an endpoint that is not currently ready to consume data may return a not ready (NAK) response (for Bulk-IN and PING transactions) or may return a not yet (NYET) signal (for a Bulk-OUT transaction). The schedule architecture and traversal rules may lead to frequent transactions to an endpoint with commensurate NAK (or NYET) responses. The endpoint may be repeatedly polled at the rate of once per list traversal until it delivers all of its data even though the endpoint may NAK transactions for periods of time.

Structures in the asynchronous schedule list 65 may often persist for periods of time relative to the host controller's internal operation. For example, a device driver for the USB device 40 may create a pair of Bulk-IN and Bulk-OUT queue heads and transfer descriptors when a device adapter is enabled (e.g., when a network cable is plugged-in, or the adapter is associated with a wireless access point such as a Bluetooth adapter and is enabled). The transfer descriptors may be modified (e.g., by retiring completed transfer descriptors or by adding new transfer descriptors) only when data is actively flowing, and the host controller 20 may execute transactions from each transfer descriptor many times before the data transfer is successfully completed.

Servicing the asynchronous schedule list 65 may include frequent accessing of the main memory 60 by the USB host controller 20 to schedule data structures. This may be true even if pauses are injected during intervals such as when all the queue heads are inactive or during each Start of Frame (SOF). The polling rate of the USB host controller 20 may be quite aggressive (e.g., <10 µsec) in order to accommodate the USB devices 40 that require maximum responsiveness and throughput.

The USB 2.0 protocol may be effective in moving large amounts of data. The USB 2.0 protocol may provide a flow control mechanism where a USB device responds with a NAIL response to a transaction and leaves the decision about when to retry to the USB host controller 20. The USB host controller 20 may attempt to resume the data stream by issuing another transaction request to move data at the earliest opportunity (e.g., the very next transaction on the bus). Bulk transfers may use short bursts over an extended period of time to transfer large quantities of data. Most USB networking and mass storage devices may rely entirely on the bulk transfer type to move data.

However, mismatches may occur between the available bandwidth of the USB host controller 20 and the USB device 40. The USB 2.0 protocol may not provide a mechanism for USB devices to asynchronously notify the USB host controller 20 that data is ready for transfer or space is available to accept data. This may result in long periods where the USB host controller 20 repeatedly polls USB devices to determine when they are ready to either produce (e.g., Bulk-IN) or consume (e.g., Bulk-OUT) data. This polling may result in multiple accesses to the main memory 60 by the USB host controller 20 for such tasks as reading from the asynchronous schedule list 65 and writing back a status of the transfer. These periods of high transaction activity that have little or no real data being transferred may lead to inefficiencies in power consumption by the USB host controller 20.

Frequent polling may improve the responsiveness of the system and reduce the amount of buffering (data storage) required on the device. However, a USB device with a low data transfer rate or having an indeterminate time of data arrival (such as a networking device) may respond to multiple polling requests with a not ready (or NAK) response until the device is ready to move data. These cycles of polling requests and not ready responses may result in inefficiencies in the platform with respect to power consumption.

This frequent polling of USB devices and frequent access to the main memory 60 by the USB host controller 20 may not only cause more power to be consumed by the USB host controller 20, the USB ports 25, and the USB devices 40, but may also defeat other power reduction schemes implemented in the computer system. Although this reliance on the main memory 60 may be the cause of many power management issues, any major change to the role of the USB host controller 20 or the main memory 60 may negatively impact the existing software infrastructure.

Figure 2:
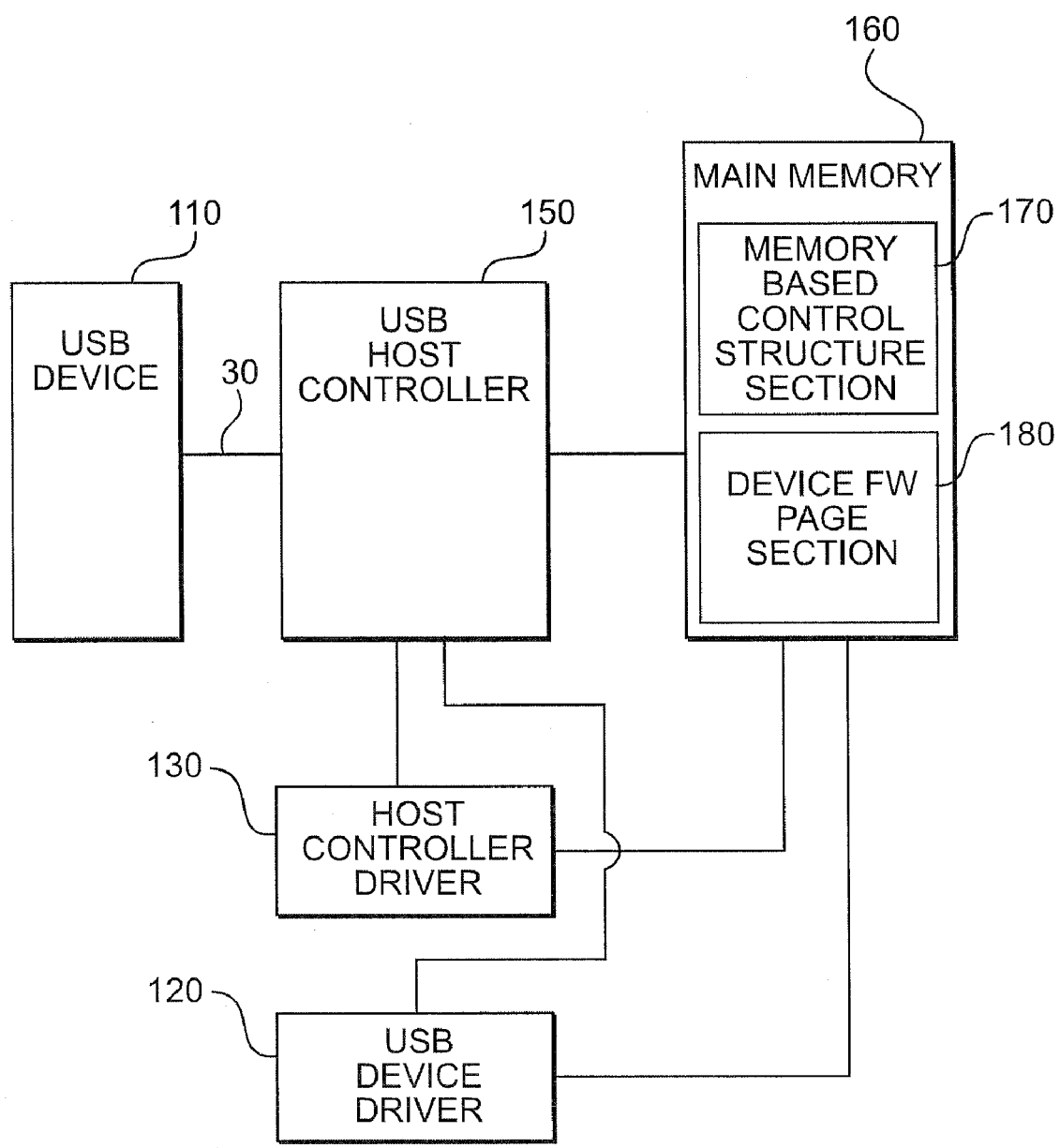
FIG. 2 is a diagram of a computer system according to an example embodiment of the present invention.

During attachment of a USB device to a USB port of a USB host controller, the associated device driver may perform various operations as discussed below with respect to FIG. 2. That is, FIG. 2 is a diagram of a computer system according to an example embodiment of the present invention. Other embodiments and configurations are also within the scope of the present invention.

FIG. 2 shows a USB device 110, a device driver 120, a host controller driver 130, a USB host controller 150 (or host controller), and a main memory 160 (or system memory) that stores information in a memory based control schedule section 170 and a device FW page section 180. Although not specifically shown, the main memory 160 may include an asynchronous schedule list and a periodic schedule list. The USB host controller 150 may operate in accordance with Link Power Management (LPM). The USB host controller 150 may correspond to the USB host controller 20 shown in FIG. 1 and the USB device 110 may correspond to the USB device 40 shown in FIG. 1.

When the USB device 110 attaches to a corresponding USB port of the USB controller 150, the following operations may occur based on operations of the device driver 120. The device driver 120 may load firmware (FW) of the USB device 110 into non-paged memory of the main memory 160. For example, the device FW may be stored in the device FW page section 180 of the main memory 160. The device driver 120 may then inform the USB device 110 of a physical location(s) (i.e., a physical address) of the device FW within the main memory 160. The entire device FW image may not be physically contiguous with other data in the main memory 160.

The device driver 120 may schedule a transaction to a predefined endpoint on the USB device 110 that correlates with a paging request endpoint (or paging request channel) of the USB device 110. The device driver 120 may schedule a transaction to a predefined endpoint on the USB device 110 that correlates with a paging data endpoint (or paging request channel) of the USB device 110. The endpoints may be bulk-in (paging request) and bulk-out (paging data) endpoints, which may be used for requesting and receiving portions of the FW image resident in the main memory 160.

The device driver 120 may further establish a link between the device 110 and the host controller 150 such that payload data for the paging request transactions may point to a descriptor for the paging data endpoint (or channel).

However, in order for operations to occur, the paging request transaction may be deferred by the host controller 150 and the host controller driver 130 may avoid (or minimize) constant polling of the request between the host controller 150 and the USB device 110.

When the USB device 110 requires or desires new code to be paged in (or received) from the main memory 160, the following operations may be performed with respect to code pages in the device FW page section 180 of the main memory 160.

The USB device 110 may create an image of a USB page descriptor. The USB page descriptor may include universal serial bus/enhanced host controller interface (USB/EHCI) Queue Head (QH) and a Transfer Descriptor (TD). The queue head (QH) and the transfer descriptor (TD) image may be transferred from the USB device 110 to the main memory 160 via a paging request endpoint. The USB device driver 120 requests a transfer from the paging request endpoint to receive the updated USB page descriptor from the USB device 110. The host controller driver 130 may place this transfer request into the appropriate host controller schedule queue.

The queue head (QH) and the transfer descriptor (TD) may define pages of physical memory in the main memory 160 associated with code of the device FW that needs to provided (or is desired to be provided) to the USB device 110. The USB device 110 may have previously transferred an initial template of the queue head (QH) and the transfer descriptor (TD) from the main memory 160.

The USB link 30 between the USB device 100 and the host controller 150 may be resumed (and properly powered), if necessary. In other words, the link 30 may be placed into an operational state.

Data for the paging request channel may be queued up. That is, the paging request channel/endpoint may be managed by the page manager in FW. When new pages are required, the page manager may determine the physical page and use the controller to send back to the device (when the transaction is executed by the USB host controller 150). The data may include the queue head (QH) and the transfer descriptor (TD) images for the page data request. Stated differently, the USB device 110 may create an image of a USB page descriptor that includes the queue head and the transfer descriptor.

The queue head (QH) and the transfer descriptor (TD) for the page data request channel may then be transferred to the main memory 160 (via the host controller 150). The USB device driver 120 requests a transaction and then the host controller driver 130 stores this transaction in the appropriate scheduler queue entry. Accordingly, the QH/TD is stored in the main memory 160. The USB host controller 150 includes logic to receive a page descriptor from the USB device 110. The USB host controller 150 also includes logic to transfer the received page descriptor to a schedule list of the main memory 160 (based on an address in the page descriptor).

The main memory 160 may then respond to the incoming data request on the paging data channel. The response may contain the requested code page(s) for the USB device 110. That is, logic of the USB host controller 150 may provide the code data from the main memory 160 to the USB device 110 based on the schedule list.

Embodiments of the present invention may include a page manager (or FW) within the USB device 110, a page data request and data queue head (QH) and transfer descriptor (TD) elements, and the device driver 120 that initializes the required data structures. Embodiments of the present invention may enable USB devices to utilize paging algorithms.

Figure 3:
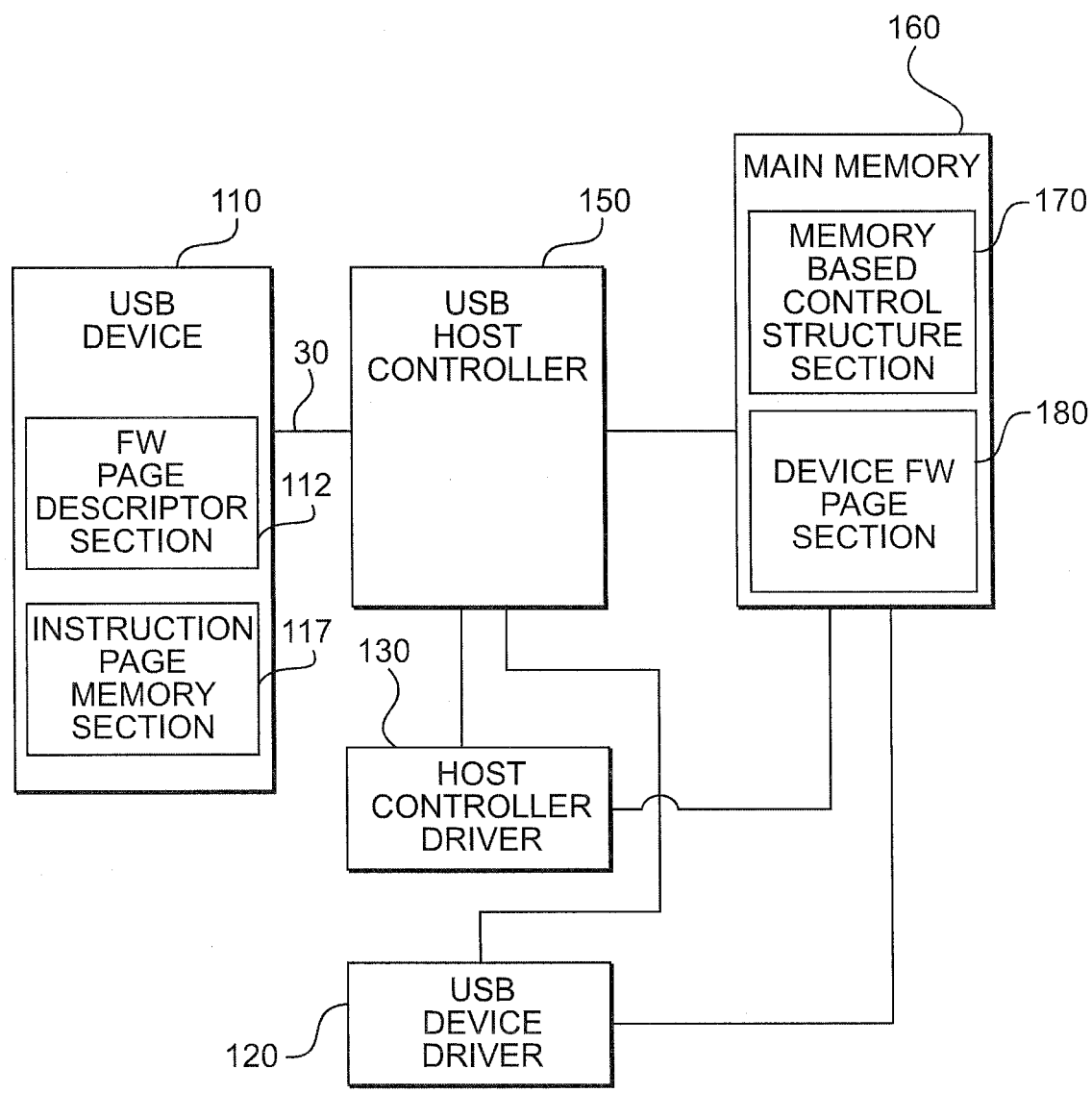
FIG. 3 is a diagram of a computer system according to an example embodiment of the present invention.

FIG. 3 is a diagram of a computer system according to an example embodiment of the present invention. Elements within FIG. 3 correspond to elements in FIG. 2. For example, FIG. 3 shows the USB device 110, the device driver 120, the host controller driver 130, the USB host controller 150 (or host controller), and the main memory 160 that stores data in the memory based control structure section 170 and the device FW pages section 180. Although not shown, the main memory 160 may include an asynchronous schedule list and a periodic schedule list. As shown in FIG. 3, the USB device 110 may include memory having a FW page descriptor section 112 and an instruction page memory section 117.

The operations discussed below with respect to FIG. 3 may occur after the device driver 120 performs initialization to establish necessary memory based control structures.

The device FW of the USB device 110 may determine a need or desire to receive code page data and may power up the link 30 between the USB device 110 and the USB host controller 150 from a low power state, if necessary. This may place the link 30 in an operation state. The device FW of the USB device 110 may modify information in the FW page descriptor section 112 of the USB device 110 to access a specific code page in the device FW page section 180. That is, the USB device 110 may create an image of a page descriptor. Information to access the code page may be based on a physical address that was previously downloaded to the USB device 110 when the code pages were previously stored in the main memory 160.

After establishing and powering the link 30 between the USB device 110 and the USB host controller 150, the USB host controller 150 may issue a transfer request from the USB device 110. The USB driver 120 has previously established a link between payload data for the transfer and the transfer descriptor that will be used to do the actual transfer of the code page from the main memory 160. The USB device 100 may respond to the transfer request from the USB host controller 150 by providing the FW page descriptor data (from the FW page descriptor section 112) as a payload.

The USB host controller 150 includes logic to receive the FW page descriptor data from the USB device 110 and to transfer and store the FW page descriptor data into the main memory 160 at the physical address specified by the transfer descriptor. That is, the host controller 150 stores the data in the main memory 160 at a location based on the transfer descriptor. The physical address may be an address of an inactive transfer descriptor in the asynchronous schedule list (or transaction list) for the USB host controller 150. The device FW may have previously received the physical address to the code page that needs to be transferred from the main memory 160. Stated differently, logic of the host controller 150 receives the payload of the page descriptor and stores the data in the asynchronous transaction list. The device 110 thereby autonomously provides a new transaction into the asynchronous scheduler list of the USB host controller 150.

Logic of the host controller 150 may then identify an active transfer descriptor in the asynchronous schedule list that points to a FW code page to be transferred from the device FW page section 180 of the main memory 160 to the corresponding USB device 110.

When the USB host controller 150 obtains a newly active transfer descriptor, which was established by the previous transfer from the USB device 110, the host controller 150 may send a transfer request to the USB device 110. The payload data of the transfer request may be the requested FW code page (or code data). Logic of the host controller 150 provides this data because the physical address was previously supplied from the USB device 110 and because the endpoint address corresponds to the USB device 110.

The USB device 110 may receive the transfer request on the code page endpoint and receives data from the USB host controller 150.

The FW of the USB device 110 may move the transferred data from the USB interface to the instruction memory section 117 of the USB device 110 and allow the transferred data to be executed. This may complete the process for a specific code page request and fulfillment.

Figure 4:
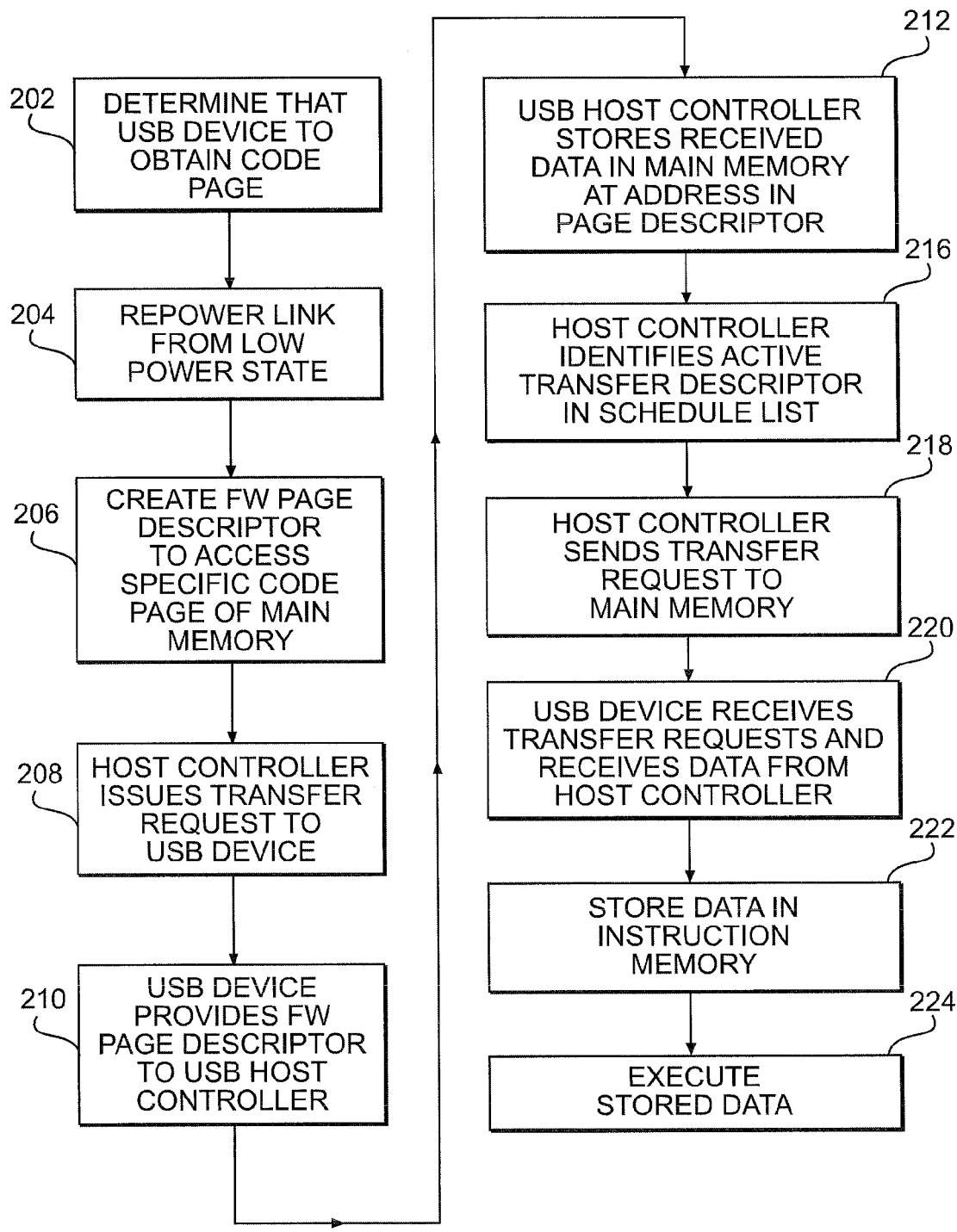
FIG. 4 is a flowchart showing an example embodiment of the present invention.

FIG. 4 is a flowchart of an embodiment of the present invention. Other operations, orders of operations and embodiments are also within the scope of the present invention. The flowchart may be described with respect to the elements shown in FIG. 3, although other elements in different configurations may also be used.

In operation 202, the USB device 110 may determine a need or desire to obtain code page data from the main memory. A link between the USB device 110 and the USB host controller 150 may be powered up (or repowered) from a low power state to an operation state in operation 204. In operation 206, a FW page descriptor may be created or modified to access a specific code page in the main memory 160. In operation 208, the USB host controller 150 may issue a transfer request to the USB device 110. The USB device 110 may provide or transfer FW page descriptor data to logic of the USB host controller 150 in operation 210. Logic of the USB host controller 150 may store the received data in the main memory 160 at an address specified in the FW page descriptor in operation 212. This may include modifying the schedule list in the main memory based on transferred data.

In operation 216, logic of the USB host controller 150 may identify an active transfer descriptor in the asynchronous schedule list. The host controller 150 may send a transfer request to the USB device 110 in operation 218. In operation 220, the USB device 110 may receive the transfer request and receive data from logic of the host controller 150. In operation 222, the data may be stored in instruction memory. In operation 224, the stored data may be executed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
   creating an image of a page descriptor at a universal serial bus (USB) device coupled to a USB port, the page descriptor including a queue head and a transfer descriptor;
   transferring the image of the page descriptor from the USB device to a memory;
   modifying a schedule list in the memory based on the transferred image;
   identifying an active transaction in the modified schedule list; and
   providing code data to the USB device from the memory based on the identified active transaction.

2. The method of claim 1, further comprising executing the code data at the USB device.

3. The method of claim 1, wherein transferring the image includes a host controller storing data in the memory.

4. The method of claim 3, wherein the data is stored in the memory based on an address in the page descriptor.

5. The method of claim 1, further comprising determining that the USB device is to obtain code data from the memory.

6. The method of claim 5, further comprising providing an operation link between the USB device and a host controller in response to the USB device determining to obtain code data from the memory.

7. The method of claim 1, wherein the schedule list comprises an asynchronous schedule list in the memory.

8. The method of claim 1, further comprising a host controller providing a transfer request to the USB device prior to transferring the image of the page descriptor.

9. The method of claim 1, further comprising the host controller providing a transfer request to the memory prior to providing the code data to the USB device from the memory.

10. The method of claim 1, wherein the modifying, the identifying and the providing occur without operations of a USB device driver.

11. A host controller comprising:
    logic to receive a page descriptor that includes a queue head and a transfer descriptor from a universal serial bus (USB) device coupled to a USB port of the host controller;
    logic to transfer the received page descriptor to a schedule list of a memory based on an address in the received page descriptor that includes the queue head and the transfer descriptor; and
    logic to provide code data from the memory to the USB device based on the schedule list.

12. The host controller of claim 11, wherein the schedule list of the memory is modified based on the page descriptor received from the host controller.

13. The host controller of claim 12, wherein the host controller identifies an active transaction in the modified schedule list.

14. The host controller of claim 11, wherein the schedule list comprises an asynchronous schedule list.

15. A method comprising:
    transferring a page descriptor from a universal serial bus (USB) device coupled to a USB port, the page descriptor including a queue head and a transfer descriptor, the page descriptor to identify an address of page code in a memory;

storing the page descriptor transferred from the USB device in a schedule list of the memory based on the address in the transferred page descriptor; and providing code data from the memory to the USB device based on a transaction of the schedule list.

16. The method of claim 15, further comprising determining that the USB device is to obtain code data from the memory, and providing an operation link between the USB device and a host controller in response to the USB device determining to obtain code data from the memory.

17. The method of claim 15, further comprising executing the code data at the USB device.

18. The method of claim 15, wherein the schedule list comprises an asynchronous schedule list in the memory.

* * * * *